(12) United States Patent
Tamiya

(10) Patent No.: US 8,448,172 B2
(45) Date of Patent: May 21, 2013

(54) CONTROLLING PARALLEL EXECUTION OF PLURAL SIMULATION PROGRAMS

(75) Inventor: Yutaka Tamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 12/926,688

(22) Filed: Dec. 3, 2010

(65) Prior Publication Data

US 2011/0161966 A1 Jun. 30, 2011

(30) Foreign Application Priority Data

Dec. 25, 2009 (JP) ................. 2009-295592

(51) Int. Cl.
*G06F 9/46* (2006.01)
(52) U.S. Cl.
USPC ............. 718/100; 718/101; 703/13; 703/22
(58) Field of Classification Search
None
See application file for complete search history.

(56) References Cited

U.S. PATENT DOCUMENTS

| 6,339,836 | B1 * | 1/2002 | Eisenhofer et al. | 716/106 |
| 2008/0126068 | A1 * | 5/2008 | O'Niell et al. | 703/20 |
| 2009/0150136 | A1 * | 6/2009 | Yang | 703/13 |

FOREIGN PATENT DOCUMENTS

JP 2000-268005 9/2000

* cited by examiner

*Primary Examiner* — Emerson Puente
*Assistant Examiner* — Dong Kim
(74) *Attorney, Agent, or Firm* — Staas & Halsey LLP

(57) ABSTRACT

A non-transitory recording medium has a scheduler program embodied therein for controlling parallel execution of plural simulation programs, the scheduler program causing a computer to perform a parallel execution procedure by which the plural simulation programs are performed in parallel during a period in which there is no data exchange between the plural simulation programs, and a sequential execution procedure by which the plural simulation programs are sequentially performed during a period in which there is data exchange between the plural simulation programs.

4 Claims, 14 Drawing Sheets

US 8,448,172 B2

1

CONTROLLING PARALLEL EXECUTION OF PLURAL SIMULATION PROGRAMS

CROSS-REFERENCE TO RELATED APPLICATIONS

The present application is based upon and claims the benefit of priority from the prior Japanese Patent Application No. 2009-295592 filed on Dec. 25, 2009, with the Japanese Patent Office, the entire contents of which are incorporated herein by reference.

FIELD

The disclosures herein generally relate to a scheduler program, a distributed simulation system, and a scheduler apparatus for performing a distributed simulation on a distributed environment.

BACKGROUND

In recent years, the scale of LSI (Large Scale Integration) circuits has significantly increased. A large scale simulation environment may thus be used to test LSI circuits.

With respect to a simulation environment for large-scale LSI circuits, there is a technology in which simulation time is reduced by dividing a simulation into plural simulation programs and by performing the simulation programs in a distributed computer environment (hereinafter referred to as a distributed environment).

SUMMARY

According to an aspect of the embodiment, a non-transitory recording medium has a scheduler program embodied therein for controlling parallel execution of plural simulation programs, the scheduler program causing a computer to perform a parallel execution procedure by which the plural simulation programs are performed in parallel during a period in which there is no data exchange between the plural simulation programs, and a sequential execution procedure by which the plural simulation programs are sequentially performed during a period in which there is data exchange between the plural simulation programs.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
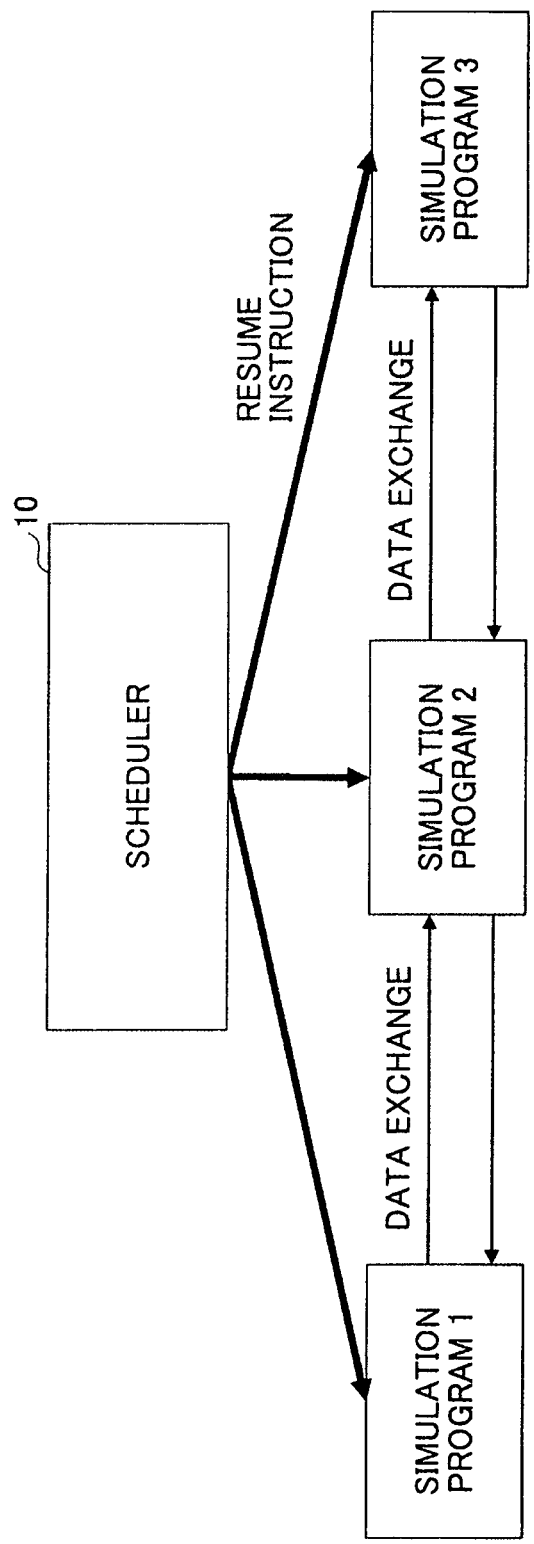
FIG. 1 is a drawing illustrating an example of the configuration of a distributed environment for performing simulation.

FIG. 1 is a drawing illustrating an example of the configuration of a distributed environment for performing simulation. In the distributed environment for performing simulation illustrated in FIG. 1, plural simulation programs 1 through 3 (hereinafter referred to as SP1 through SP3) run in parallel, thereby performing a simulation for the entire LSI circuit.

A scheduler program (hereinafter referred to as a "scheduler") 10 controls simulation timings in the distributed environment for performing simulation (hereinafter referred to as a "distributed simulation environment"), and sends simulation resume instructions to SP1 through SP3. The simulation resume instructions serve to inform SP1 through SP3 of a time slot value TS.

Upon receiving a simulation resume instruction from the scheduler 10, each of SP1 through SP3 performs a simulation for the duration of one time slot TS, and then suspends the simulation. During the simulation performed for one time slot TS, SP1 through SP3 may exchange data through inter-SP communication as illustrated in FIG. 2 if there is a demand to exchange data with another SP.

Figure 2:
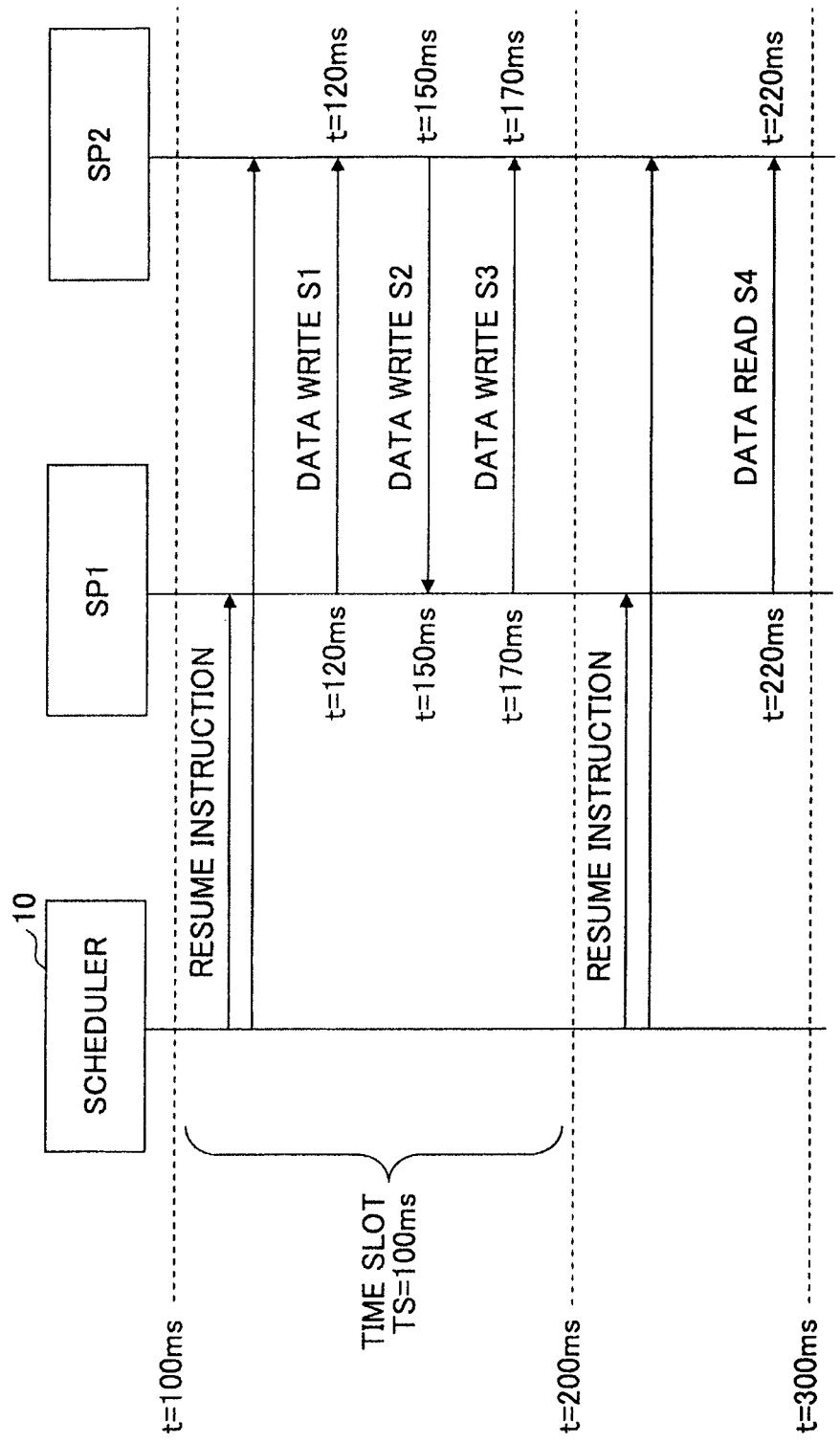
FIG. 2 is a timing chart illustrating timings at which data exchanges are performed between SPs.

FIG. 2 is a timing chart illustrating timings at which data exchanges are performed between SPs. FIG. 2 illustrates an example in which the time slot value TS is 100 msec. In FIG. 2, data write operations S1 through S3 are performed between SP1 and SP2 during the period from t=100 msec to t=200 msec. Any given one of SP1 through SP3 advances its simulation time without regard to the remaining SPs during the given one time slot TS based on the concept of a loosely-timed model.

The concept of a loosely-timed model allows data exchanges between SPs to have timing variation as long as they occur within the one time slot TS. In FIG. 2, data write operations S1 through S3 occur at 120 msec, 150 msec, and 170 msec, respectively, when the simulation times of SP1 and SP2 are perfectly synchronized with each other. In a distributed simulation environment, however, processing speed and communication speed may differ from computer to computer when performing SP1 and SP2 on different computers. In general, thus, it cannot be expected that SP1 and SP2 have the identical simulation times.

Figure 3:
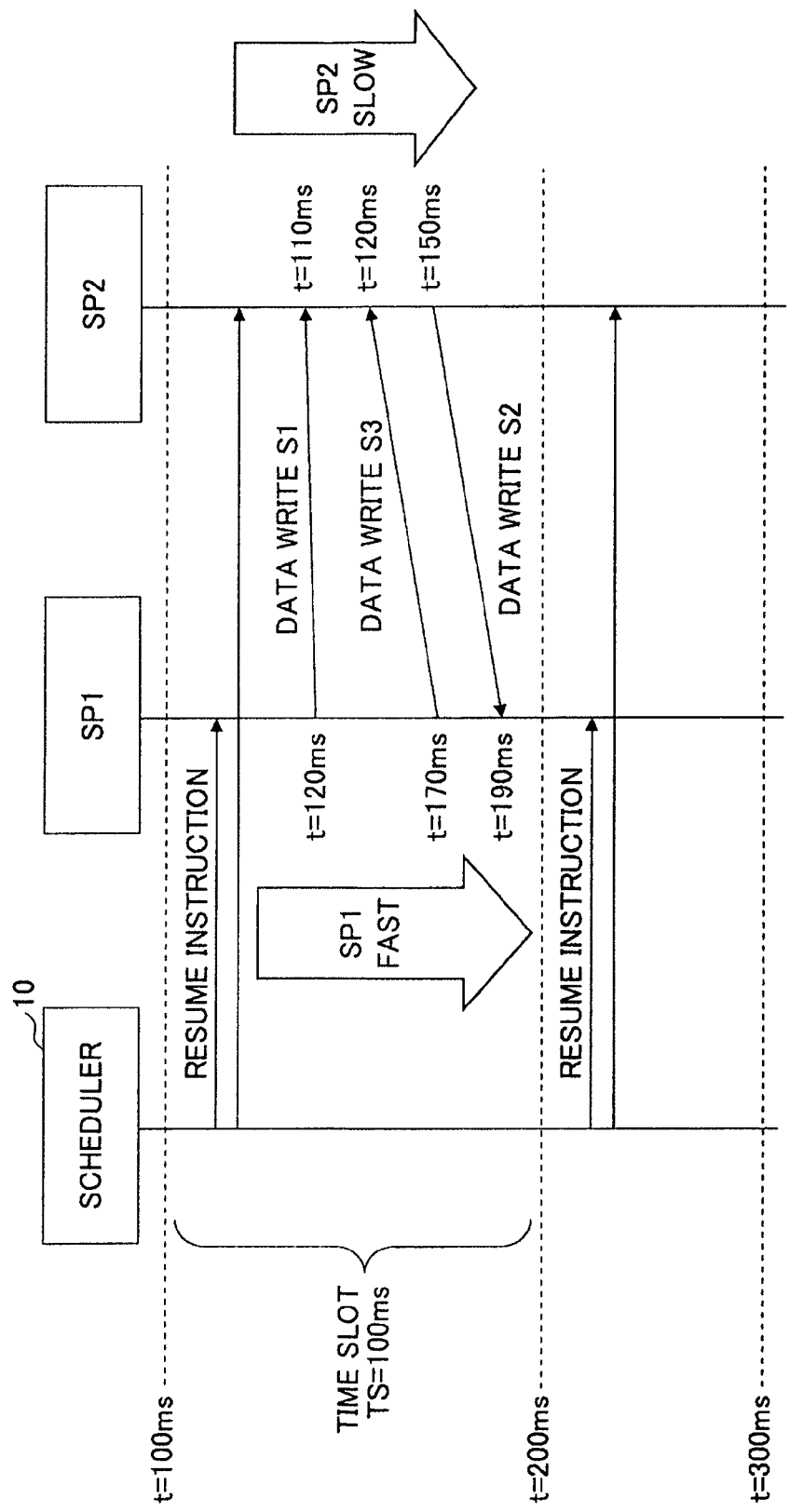
FIG. 3 is a timing chart illustrating timings at which data exchanges are performed between SPs when simulation times differ between SP1 and SP2.

FIG. 3 is a timing chart illustrating timings at which data exchanges are performed between SPs when simulation times differ between SP1 and SP2. FIG. 3 illustrates an example in which SP2 runs slower than SP1. In FIG. 3, SP1 performs data write operations S1 and S3 at 120 msec and 170 msec, respectively, according to its own simulation time. However, SP2 receives the data write operations S1 and S3 at 110 msec and 120 msec, respectively, according to its own simulation time.

In FIG. 3, further, SP2 performs a data write operation S2 at 150 msec according to its own simulation time. However, SP1 receives the data write operation S2 at 190 msec according to its own simulation time. In FIG. 3, the data write operations S2 and S3 occur in a different order than in the case of FIG. 2. Due to this difference, a data write operation S4 occurring at 220 msec in FIG. 2 never occurs in the simulation illustrated in FIG. 3.

In this manner, each SP may run on its own without regard to other SPs in a distributed simulation environment. In such a case, the identical simulation time cannot be maintained between different SPs because processing speed and communication speed differ from computer to computer.

This gives rise to a problem in that simulation results are not reproducible in a distributed simulation environment. In the distributed simulation environment where there is no reproducibility in simulation results, a bug may be detected in a tested object, but may not be reproduced again. This makes it difficult to identify the cause of a bug.

In the following, embodiments will be described by referring to the accompanying drawings.

<System Configuration>

Figure 4:
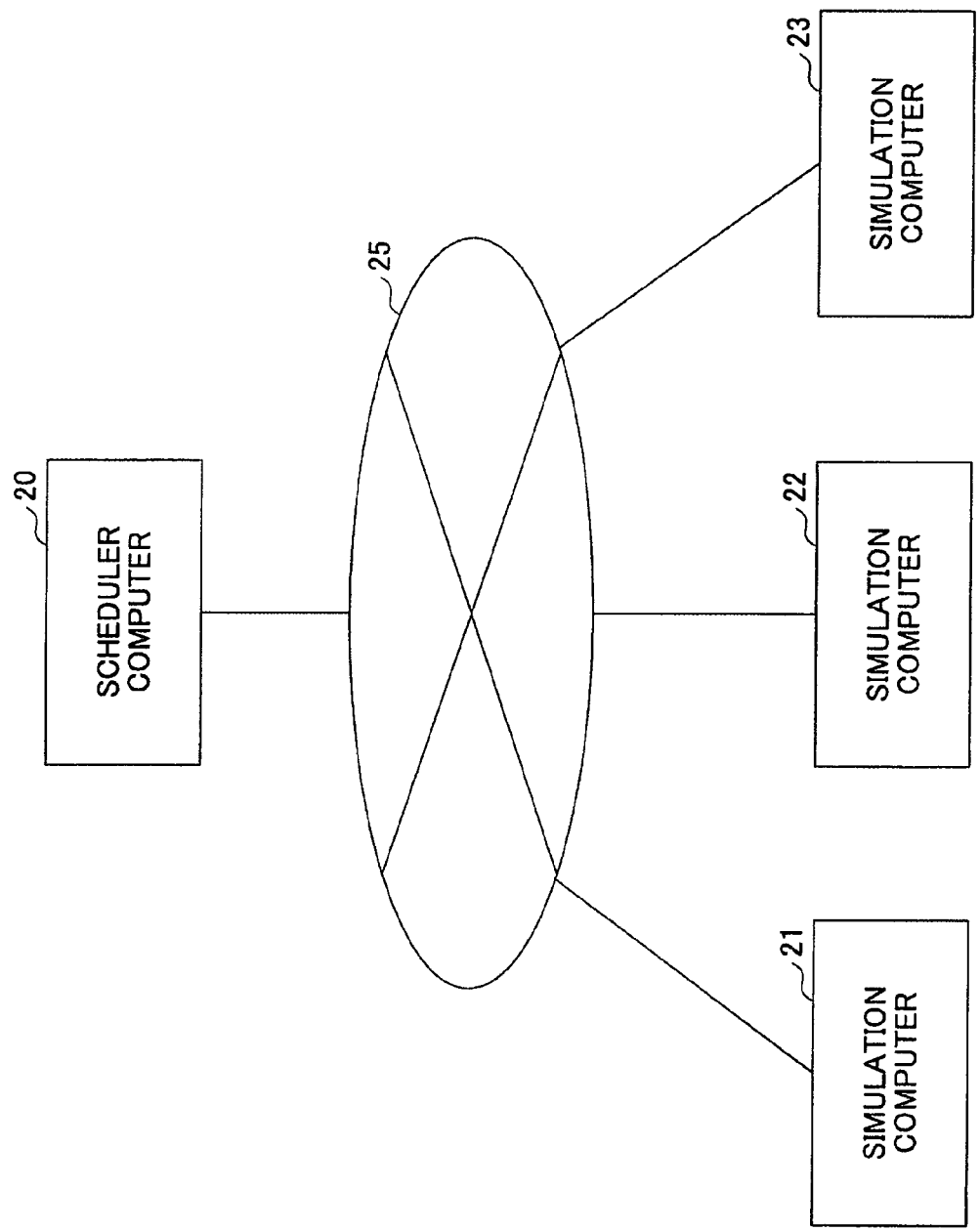
FIG. 4 is a drawing illustrating an example of the configuration of a distributed simulation environment.

FIG. 4 is a drawing illustrating an example of the configuration of a distributed simulation environment. In the system illustrated in FIG. 4, a scheduler computer 20 and simulation computers 21 through 23 are connected to each other to perform data communication through a network 25 such as the Internet or a LAN (Local Area Network).

The scheduler computer 20 executes the scheduler 10. The simulation computer 21 executes a simulation program 1 (hereinafter referred to as SP1). The simulation computer 22 executes SP2. The simulation computer 23 executes SP3.

In the example illustrated in FIG. 4, the system includes three simulation computers 21 through 23. This is not a limiting example, and the number of simulation computers may be different from three. Further, the system illustrated in FIG. 4 may be implemented by use of virtual platforms, so that the scheduler 10 and SP1 through SP3 run on virtual computers.

<Hardware Configuration>

Figure 5:
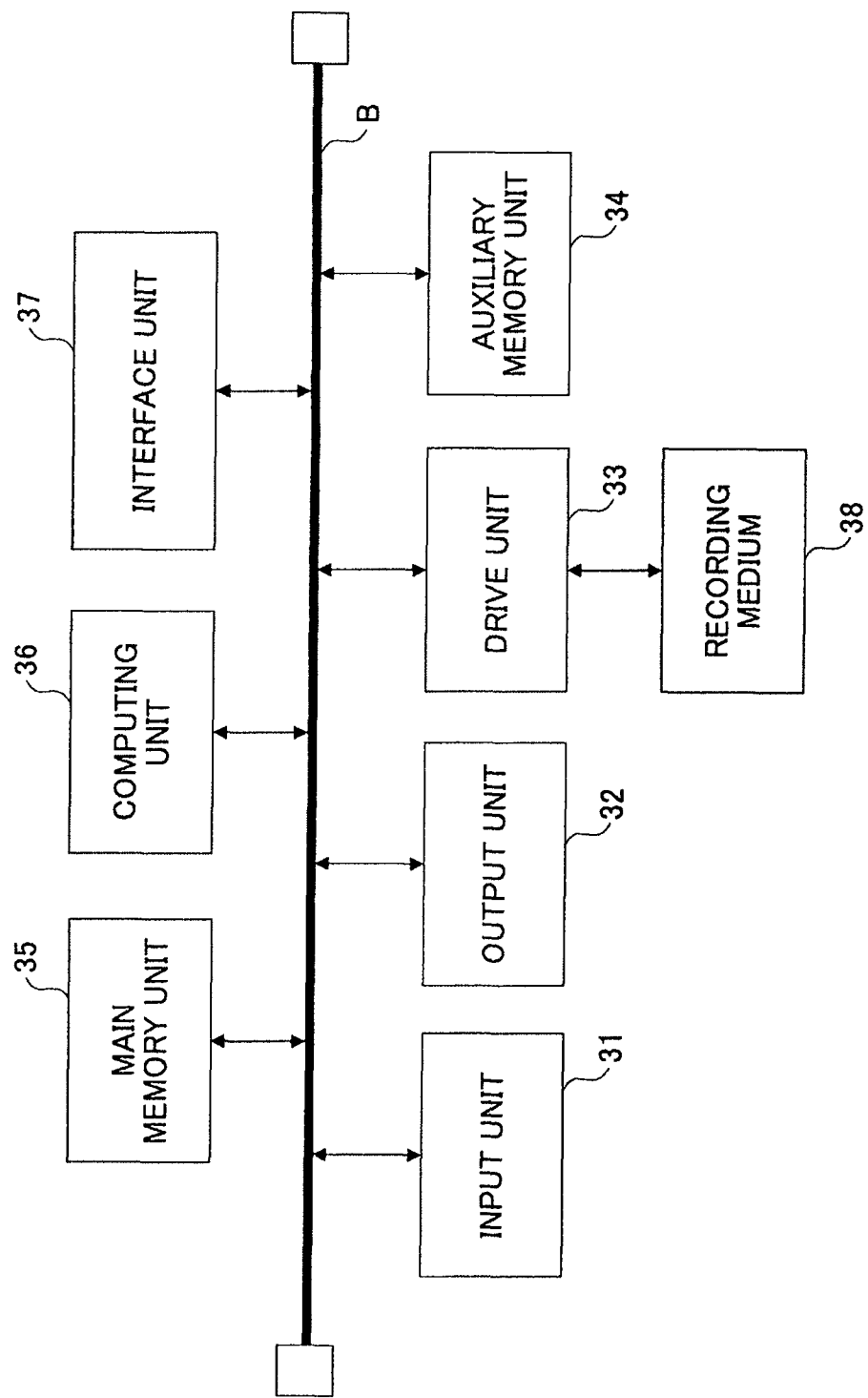
FIG. 5 is a drawing illustrating an example of the hardware configuration of a computer that executes a scheduler or a simulation program.

FIG. 5 is a drawing illustrating an example of the hardware configuration of a computer that executes a scheduler or a simulation program. A computer includes an input unit 31, an output unit 32, a drive unit 33, an auxiliary memory unit 34, a main memory unit 35, a computing unit 36, and an interface unit 37, all of which are connected together via a bus B.

The input unit 31 may include a keyboard and mouse. The input unit 31 serves to receive various input signals. The output unit 32 may include a display apparatus. The output unit 32 serves to display various types of windows, data, and the like. The interface unit 37 may include a modem or LAN card, for example. The interface unit 37 serves to provide connection with the network 25.

The scheduler 10 of the present embodiment may be at least part of various programs for controlling the scheduler computer 20. SP1 through SP3 of the present embodiment may be at least part of various programs for controlling the simulation computers 21 through 23. The scheduler 10 and SP1 through SP3 are provided through the delivery of a recording medium 38 or through downloading via the network 25. The recording medium 38 having the scheduler 10 and SP1 through SP3 recorded therein can be any type of recording medium. That is, it may be a computer-readable, non-transitory medium for recording information by use of an optical, electrical, or magnetic means such as a CD-ROM, a flexible disk, or a magneto-optical disk, or may be a semiconductor memory for recording information by use of an electrical means such as a ROM or a flash memory.

Upon setting the recording medium 38 containing the scheduler 10 to the drive unit 33, the scheduler 10 is installed from the recording medium 38 to the auxiliary memory unit 34 through the drive unit 33. A scheduler 10 that is downloaded through the network is installed to the auxiliary memory unit 34 through the interface unit 37. The auxiliary memory unit 34 stores the installed scheduler 10, and, also, stores various files and data.

At the time of activation of the scheduler 10, the scheduler 10 is read from the auxiliary memory unit 34 to be loaded to the main memory unit 35. The computing unit 36 performs various types of processing by use of the scheduler 10 stored in the main memory unit 35 as will be describe later.

Upon setting the recording medium 38 containing SP1 through SP3 to the drive unit 33, SP1 through SP3 are installed from the recording medium 38 to the auxiliary memory unit 34 through the drive unit 33. SP1 through SP3 that are downloaded through the network are installed to the auxiliary memory unit 34 through the interface unit 37. The auxiliary memory unit 34 stores installed SP1 through SP3, and, also, stores various files and data.

At the time of activation of SP1 through SP3, SP1 through SP3 are read from the auxiliary memory unit 34 to be loaded to the main memory unit 35. The computing unit 36 performs various types of processing by use of SP1 through SP3 stored in the main memory unit 35 as will be describe later.

<Block Configuration>

Figure 6:
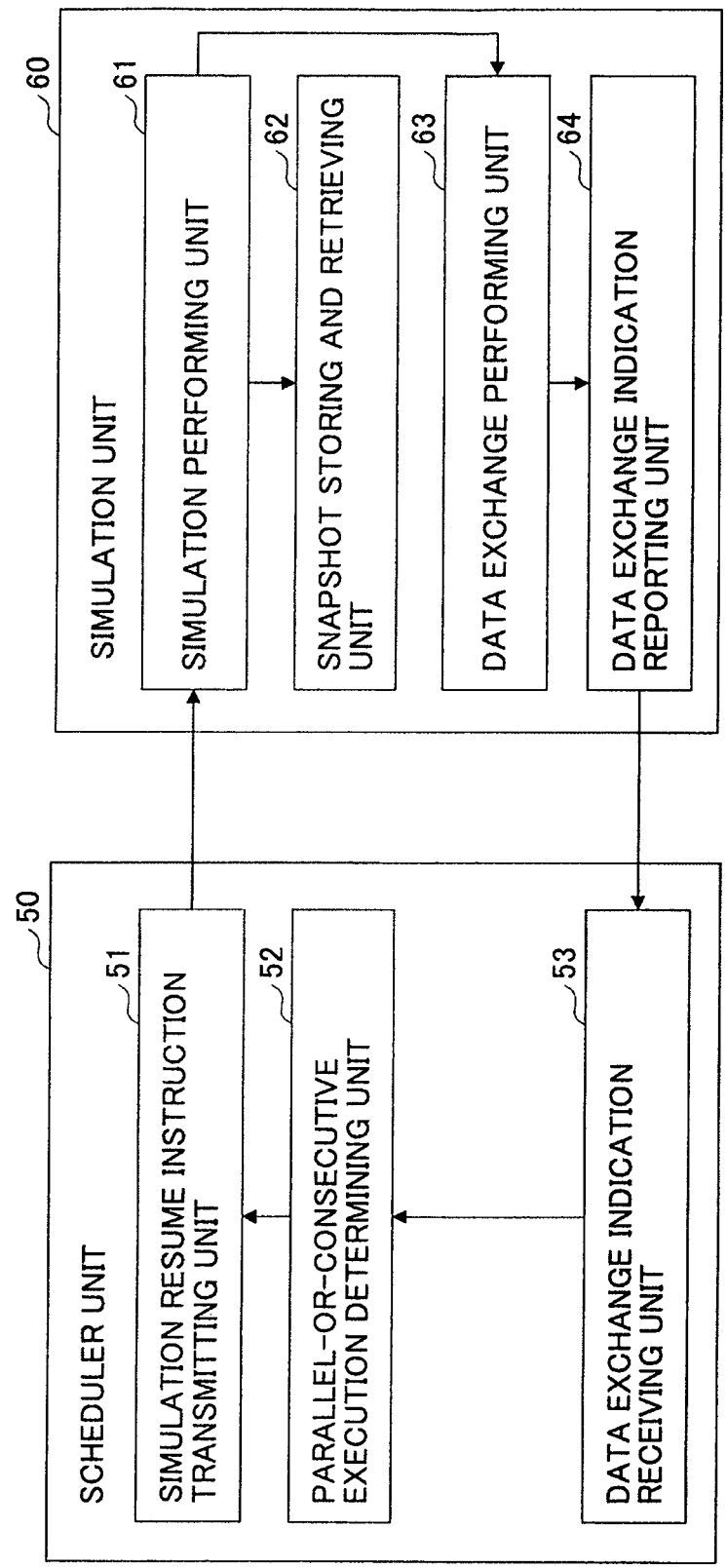
FIG. 6 is a block diagram illustrating an example of a scheduler unit and a simulation unit that are implemented by executing scheduler and simulation programs on computers.

FIG. 6 is a block diagram illustrating an example of a scheduler unit and a simulation unit that are implemented by executing the scheduler and simulation programs on computers. FIG. 6 illustrates only one simulation unit 60. In reality, however, three simulation units 60 are provided by SP1 through SP3 executed by computers.

A scheduler unit 50 includes a simulation resume instruction transmitting unit 51, a parallel-or-sequential execution determining unit 52, and a data exchange indication receiving unit 53. A simulation unit 60 includes a simulation performing unit 61, a snapshot storing and retrieving unit 62, a data exchange performing unit 63, and a data exchange indication reporting unit 64.

In the present embodiment, the scheduler unit 50 instructs the three simulation units 60 to perform simulations by selecting sequential execution or parallel execution in a distributed simulation environment, thereby guaranteeing the reproducibility of simulation results.

The parallel-or-sequential execution determining unit 52 of the scheduler unit 50 requests the simulation resume instruction transmitting unit 51 of the scheduler unit 50 to instruct each simulation unit 60 to perform parallel execution. The simulation resume instruction transmitting unit 51 of the scheduler unit 50 issues a simulation resume instruction to each simulation unit 60 so as to cause each simulation unit 60 to perform parallel execution during one time slot TS.

Upon receiving the simulation resume instruction, the simulation performing unit 61 of each simulation unit 60 uses the snapshot storing and retrieving unit 62 to store the simulation conditions at the present time prior to the commencement of simulation. The simulation performing unit 61 of each simulation unit 60 then performs simulation in parallel for the duration of time TS indicated by the time slot value TS. The simulation performing unit 61 of each simulation unit 60 checks whether data exchange (i.e., data write or data read) with another simulation unit 60 is performed during the running of the simulation for the duration of time TS.

Upon detecting that data exchange with another simulation unit 60 is performed, the simulation performing unit 61 uses the snapshot storing and retrieving unit 62 to restore the stored simulation conditions. Further, the simulation performing unit 61 makes itself ready for sequential execution.

The simulation performing unit 61 notifies the data exchange performing unit 63 of a check result indicative of whether data exchange with another simulation unit 60 is performed. Upon receiving the check result indicative of the absence of data exchange, the data exchange performing unit 63 reports the check result indicative of the absence of data exchange to the data exchange indication receiving unit 53 of the scheduler unit 50 through the data exchange indication reporting unit 64.

Upon receiving a check result indicative of the presence of data exchange, the data exchange performing unit 63 reports the check result indicative of the presence of data exchange to the data exchange indication receiving unit 53 of the scheduler unit 50 through the data exchange indication reporting unit 64. The data exchange indication receiving unit 53 of the scheduler unit 50 informs the parallel-or-sequential execution determining unit 52 of the check result indicative of whether data exchange is performed, upon receiving the check result from each simulation unit 60.

Based on the received check result indicative of whether data exchange is performed, the parallel-or-sequential execution determining unit 52 of the scheduler unit 50 requests the simulation resume instruction transmitting unit 51 of the scheduler unit 50 to instruct each simulation unit 60 to perform parallel execution or sequential execution accordingly.

Upon receiving the check result indicative of the absence of data exchange from all the simulation units 60, the parallel-or-sequential execution determining unit 52 of the scheduler unit 50 requests the simulation resume instruction transmitting unit 51 of the scheduler unit 50 to instruct each simulation unit 60 to perform next parallel execution. As a result, the simulation resume instruction transmitting unit 51 of the scheduler unit 50 issues a simulation resume instruction to each simulation unit 60 so as to cause each simulation unit 60 to resume next parallel execution for one time slot TS.

Upon receiving the check result indicative of the presence of data exchange from at least one simulation unit 60, the parallel-or-sequential execution determining unit 52 of the scheduler unit 50 requests the simulation resume instruction transmitting unit 51 of the scheduler unit 50 to instruct each simulation unit 60 to perform sequential execution. As a result, the simulation resume instruction transmitting unit 51 of the scheduler unit 50 issues a simulation resume instruction to each simulation unit 60 so as to cause each simulation unit 60 to perform sequential execution during one time slot TS.

When data exchange is to be performed between simulation units 60, the simulation resume instruction transmitting unit 51 of the scheduler unit 50 issues simulation resume instructions so that the simulation units 60 sequentially perform simulations until the end of one time slot TS according to a sequence list, which will be described later. Upon receiving a simulation resume instruction for sequential execution, the simulation performing unit 61 of each simulation unit 60 performs simulation until the end of one time slot TS or until the occurrence of a data exchange with another simulation unit 60.

Upon the occurrence of a data exchange with another simulation unit 60, the simulation performing unit 61 immediately suspends the simulation. The simulation performing unit 61 sends a data exchange request to another simulation unit 60. Such another simulation unit 60 stores the received data exchange request in a queue for processing at a later timing, which will be described later.

Similarly, a data exchange may occur at another simulation unit 60, so that a request for this data exchange received from such another simulation unit 60 may be stored in a queue at the receiving end. In this case, the simulation performing unit 61 processes the data exchange request that has been received from such another simulation unit 60 and stored in the queue.

Due to the occurrence of a data exchange with another simulation unit 60, the simulation may not reach the end of one time slot TS. In such a case, the simulation performing unit 61 sends a simulation result to the parallel-or-sequential execution determining unit 52 of the scheduler unit 50 through the data exchange performing unit 63, the data exchange indication reporting unit 64, and the data exchange indication receiving unit 53 of the scheduler unit 50, thereby preparing for next sequential execution.

In the absence of data exchange with another simulation unit 60, the simulation may reach the end of one time slot TS. In such a case, the simulation performing unit 61 sends a simulation result to the parallel-or-sequential execution determining unit 52 of the scheduler unit 50 through the data exchange performing unit 63, the data exchange indication reporting unit 64, and the data exchange indication receiving unit 53 of the scheduler unit 50.

<Process Flow>

Figure 7:
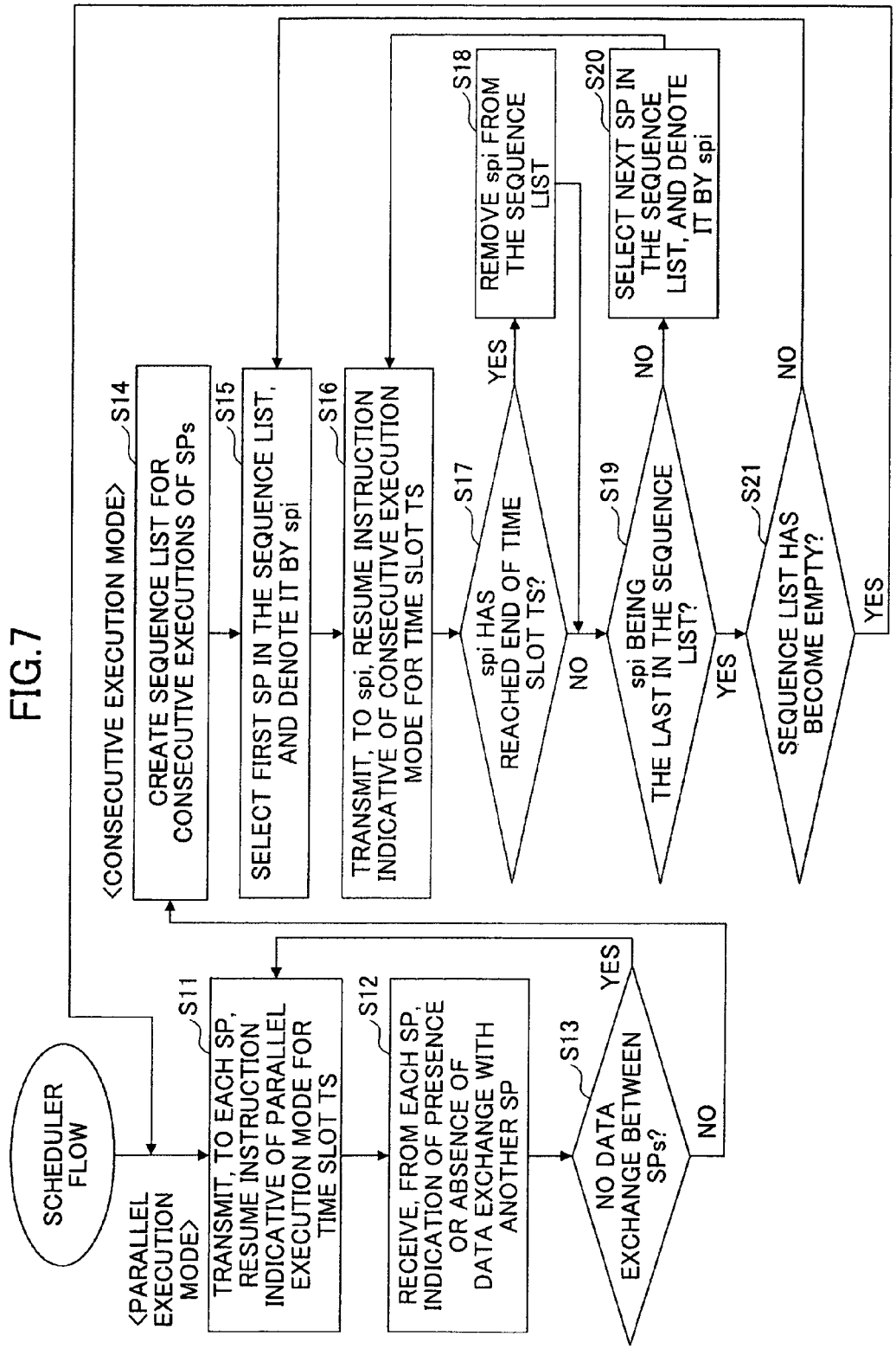
FIG. 7 is a flowchart illustrating an example of the process performed by the scheduler unit.

FIG. 7 is a flowchart illustrating an example of the process performed by the scheduler unit. In step S11, the simulation resume instruction transmitting unit 51 of the scheduler unit 50 sends a simulation resume instruction indicative of a parallel execution mode for a time slot value TS to the simulation performing unit 61 of each simulation unit 60. In step S12, the parallel-or-sequential execution determining unit 52 of the scheduler unit 50 receives from each simulation unit 60 a check result indicative of whether data exchange is performed.

In step S13, the parallel-or-sequential execution determining unit 52 determines whether data exchange is performed between simulation units 60 for the simulation resume instruction indicative of a parallel execution mode for the time slot value TS transmitted in step S11. Upon determining that no data exchange is performed between the simulation units 60, the procedure returns to step S11, in which the simulation resume instruction transmitting unit 51 transmits a simulation resume instruction indicative of a parallel execution mode for a time slot value TS to the simulation performing unit 61 of each simulation unit 60 thereby to request a next parallel execution.

Upon determining that a data exchange between simulation units 60 is performed, the procedure proceeds to step S14, in which the simulation resume instruction transmitting unit 51 makes a transition from the parallel execution mode to a sequential execution mode. The simulation resume instruction transmitting unit 51 creates a sequence list indicating the order in which sequential executions are performed by the simulation units 60. The sequence list may include SP1, SP2, and SP3 arranged in this named order, for example, thereby identifying the order in which simulation resume instructions indicative of a sequential execution mode for a time slot value TS are transmitted.

In step S15, the simulation resume instruction transmitting unit 51 selects the first simulation unit 60 in the sequence list created in step S14. In step S16, the simulation resume instruction transmitting unit 51 transmits a simulation resume instruction indicative of a sequential execution mode for a time slot value TS to the simulation performing unit 61 of the simulation unit 60 selected in step S15.

Upon receiving a simulation result from the simulation unit 60 to which the simulation resume instruction was sent in step S16, the procedure proceeds to step S17, in which the simulation resume instruction transmitting unit 51 checks whether the simulation unit 60 receiving the simulation resume instruction in step S16 has reached the time slot value TS (i.e., has reached the end of one time slot TS). If the time slot value TS has been reached, the procedure proceeds to step S18, in which the simulation resume instruction transmitting unit 51 removes the simulation unit 60 selected in step S15 from the sequence list, followed by proceeding to step S19. If the time slot value TS has not been reached, the procedure proceeds to step S19.

In step S19, the simulation resume instruction transmitting unit 51 checks whether the simulation unit 60 selected in step S15 is the last in the sequence list. If the simulation unit 60 selected in step S15 is not the last one in the sequence list, the simulation resume instruction transmitting unit 51 selects a next simulation unit 60 in the sequence list in step S20. The procedure then returns to step S16.

If the simulation unit 60 selected in step S15 is the last one in the sequence list, the simulation resume instruction transmitting unit 51 checks in step S21 whether the sequence list created in step S14 has become empty.

If the sequence list created in step S14 has not become empty, the procedure returns to step S15. If the sequence list created in step S14 has become empty, the simulation resume instruction transmitting unit 51 shifts from the sequential execution mode to a parallel execution mode. The procedure then returns to step S11.

Figure 8:
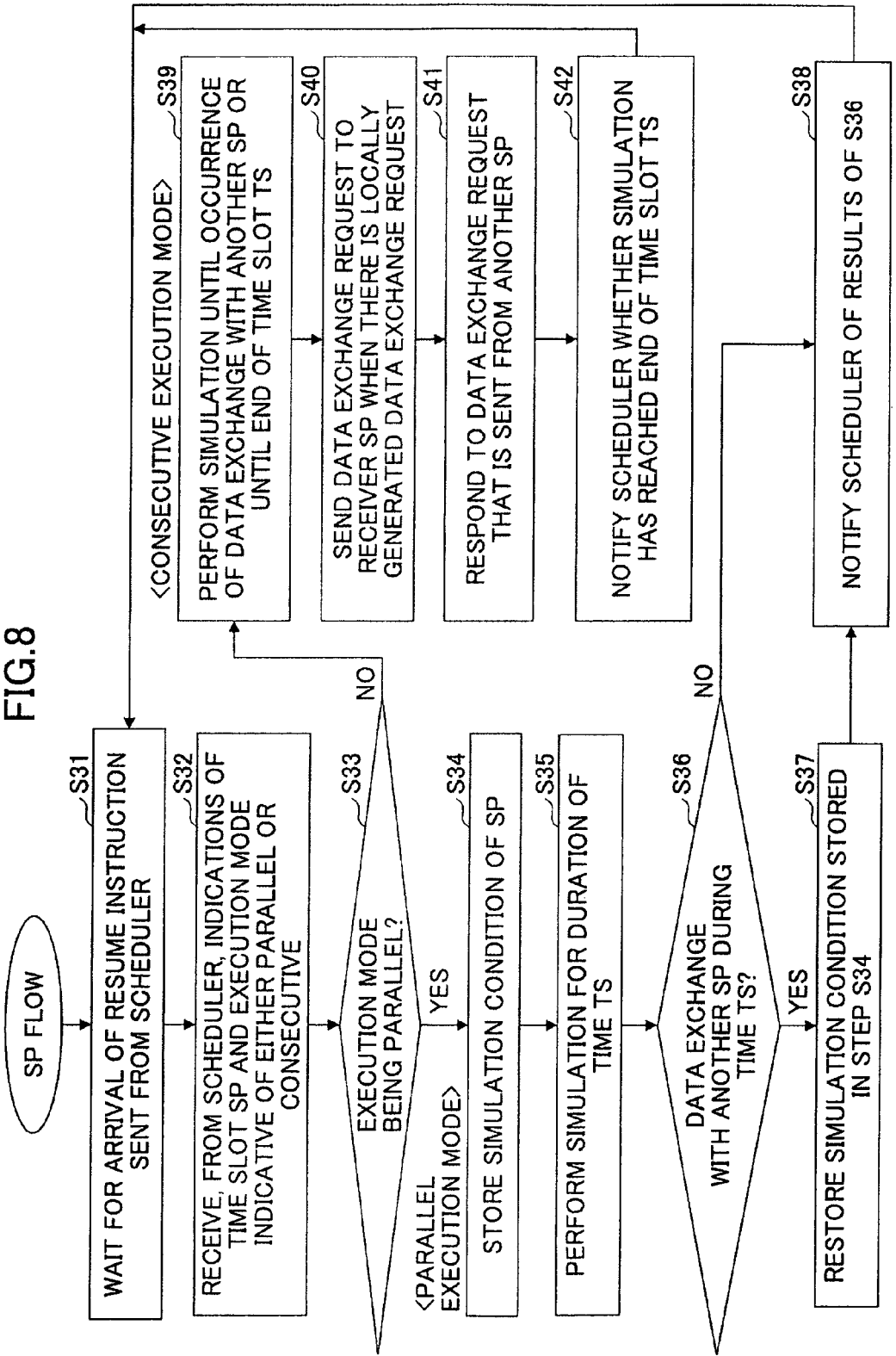
FIG. 8 is a flowchart illustrating an example of the process performed by the simulation unit.

FIG. 8 is a flowchart illustrating an example of the process performed by the simulation unit. In step S31, the simulation performing unit 61 of the simulation unit 60 waits for the arrival of a simulation resume instruction from the scheduler unit 50.

In step S32, the simulation performing unit 61 receives a simulation resume instruction which indicates a time slot value TS and an execution mode, which is either a parallel execution mode or a sequential execution mode.

In step S33, the simulation performing unit 61 determines whether the received execution mode is a parallel execution mode. If the received execution mode is a parallel execution mode, the simulation performing unit 61 uses the snapshot storing and retrieving unit 62 in step S34 to store the simulation conditions at the present time prior to the commencement of simulation.

In step S35, the simulation performing unit 61 performs simulation in parallel for the duration of time TS indicated by the time slot value TS. In step S36, the simulation performing unit 61 checks whether data exchange with another simulation unit 60 is performed during the running of simulation for the duration of time TS.

If it is determined that data exchange with another simulation unit 60 is performed during the running of simulation for the duration of time TS, the procedure proceeds to step S37.

In step S37, the simulation performing unit 61 uses the snapshot storing and retrieving unit 62 to restore the stored simulation conditions.

If it is determined that data exchange with another simulation unit 60 is not performed during the running of simulation for the duration of time TS, or after the process performed in step S37, the procedure proceeds to step S38. In step S38, the simulation performing unit 61 sends a check result indicative of whether data exchange is performed to the scheduler unit 50 through the data exchange performing unit 63 and the data exchange indication reporting unit 64. After step S38, the procedure returns to step S31.

If the received execution mode is not a parallel execution mode, the simulation performing unit 61 performs simulation in step S39 until the occurrence of data exchange with another simulation unit 60 or until the end of one time slot TS.

In step S40, the simulation performing unit 61 sends a data exchange request to the simulation unit 60 if there is a request for data exchange with another simulation unit 60. In step S41, the simulation performing unit 61 processes a data exchange request received from another simulation unit 60 if the data exchange request is sent from such another simulation unit 60 upon the occurrence of a data exchange at such another simulation unit 60.

In step S42, the simulation performing unit 61 sends simulation results to the scheduler unit 50, thereby informing the scheduler unit 50 whether the simulation has reached the time slot value TS. After step S42, the procedure returns to step S31.

Figure 9:
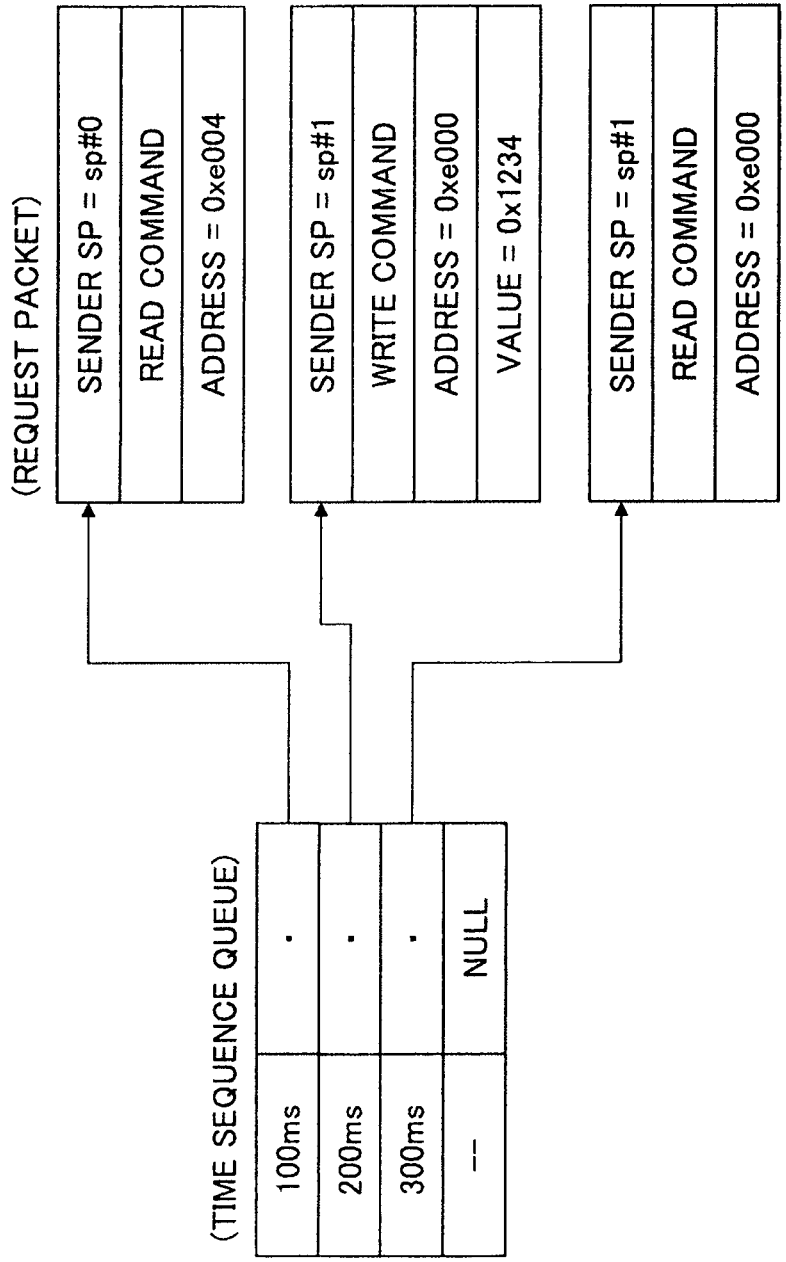
FIG. 9 is a drawing illustrating an example of the data structure of a queue for storing data exchange requests.

Each simulation unit 60 has a queue which stores data exchange requests for exchanging data with other simulation units 60. FIG. 9 is a drawing illustrating an example of the data structure of a queue for storing data exchange requests.

Information about a data exchange request is stored in one lump in the form of a request packet. In the example illustrated in FIG. 9, a request packet includes an indication of a simulation unit 60 having sent the data exchange request, an indication of a read request or a write request, an address, and a data value (for data write operation). Pointers to request packets are stored in a time sequence queue. The time sequence queue stores an indication of a simulation time at which a request packet is issued, and also stores a pointer pointing to the request packet. In order to request a data exchange, a simulation unit 60 generates a request packet, and sends the request packet to another simulation unit 60, in which the request packet is placed in its time sequence queue.

In the time sequence queue of such another simulation unit 60, an indication of the present simulation time of the simulation unit 60 having sent the data exchange request is attached to the data exchange request, which is then placed in the order of such time indications.

The simulation unit 60 that has received the data exchange request processes request packets in the time sequence queue in the ascending order of time indications (i.e., processes a request packet having an earlier time indication ahead of a request packet having a later time indication). In so doing, the simulation unit 60 does not process a request packet having an indication of a simulation time that is later than its present simulation time. A processed request packet is removed from the time sequence queue.

First Embodiment

Figure 10:
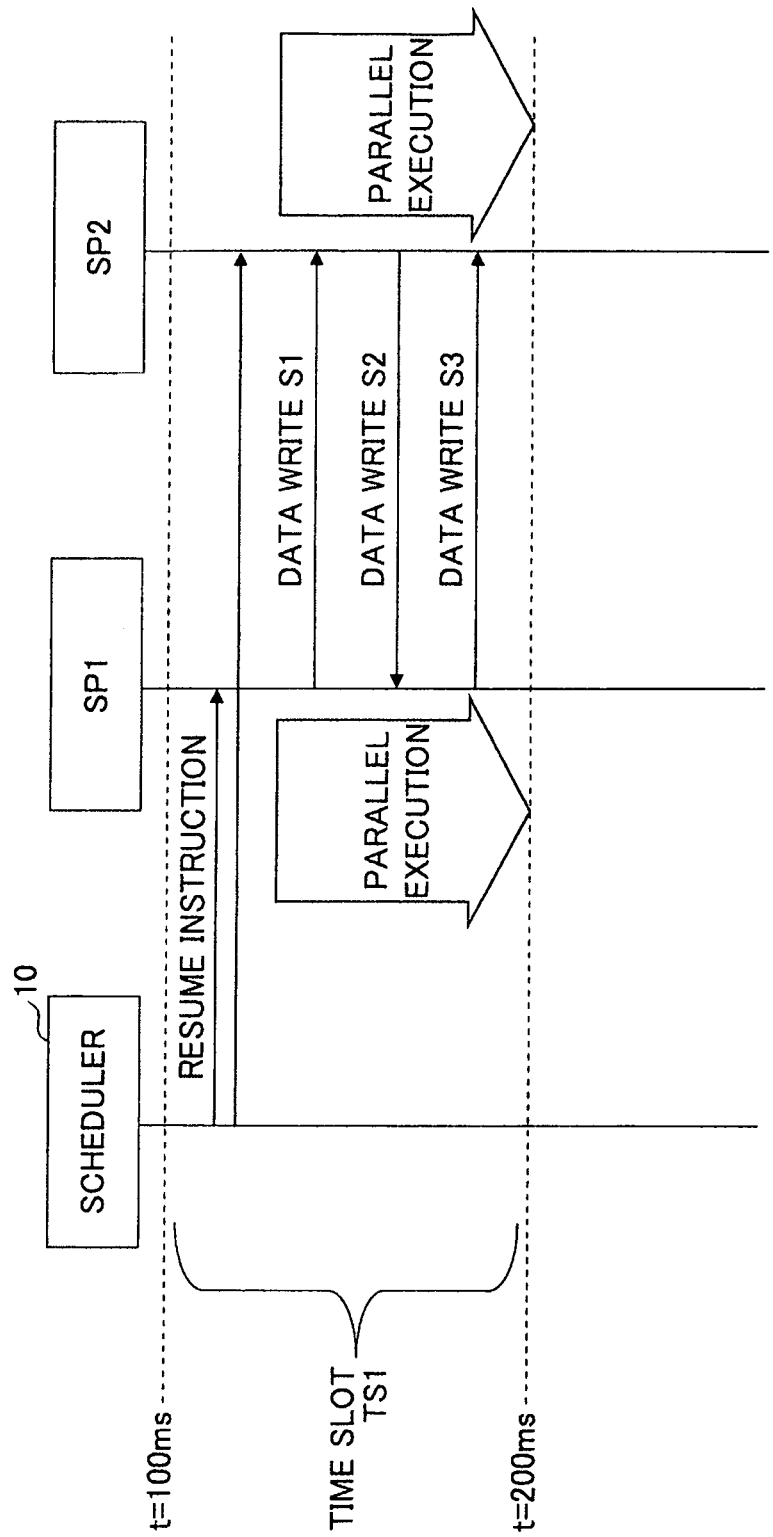
FIG. 10 is a first timing chart illustrating timings at which data exchanges are performed between SPs according to one embodiment.
Figure 11:
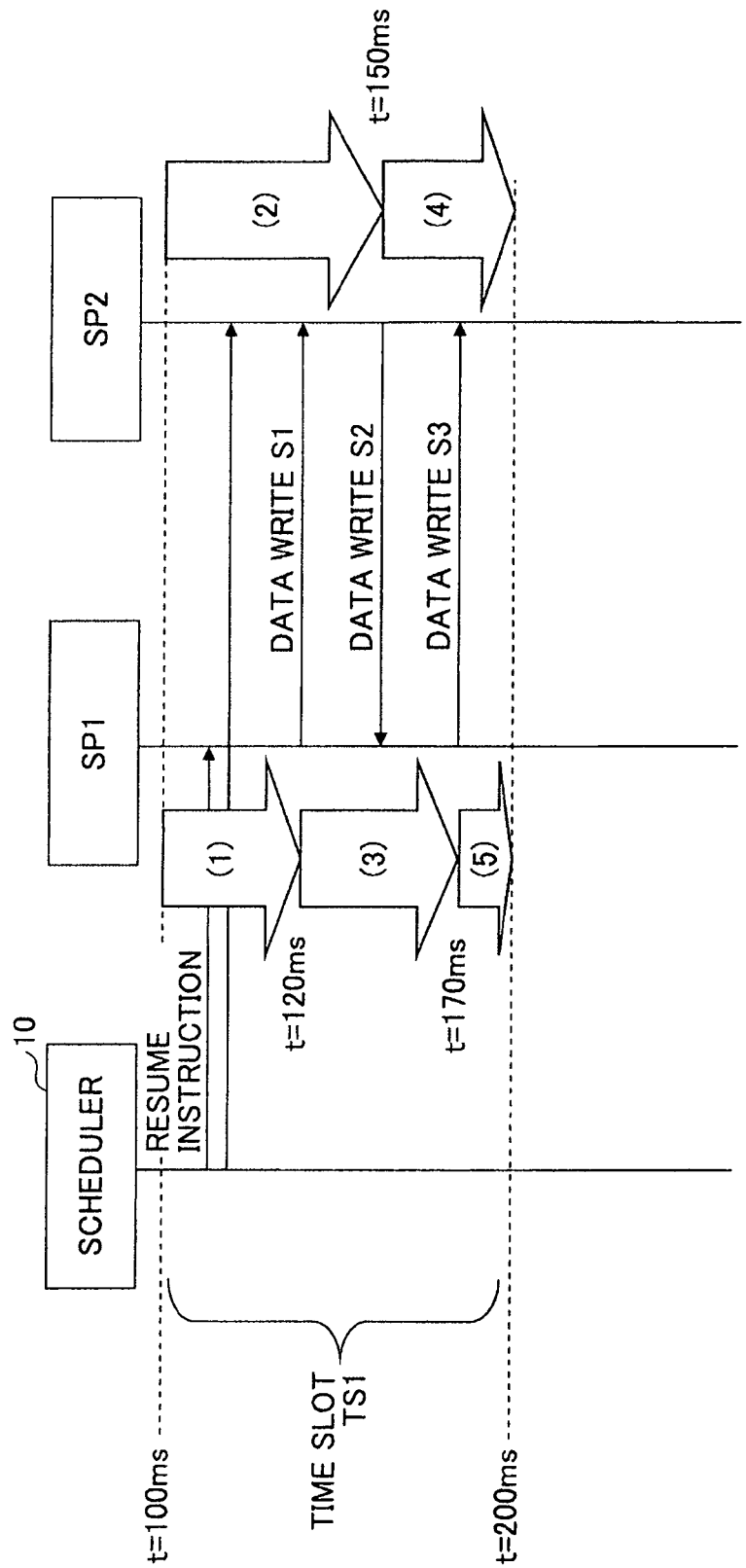
FIG. 11 is a second timing chart illustrating timings at which data exchanges are performed between SPs according to the one embodiment.
Figure 12:
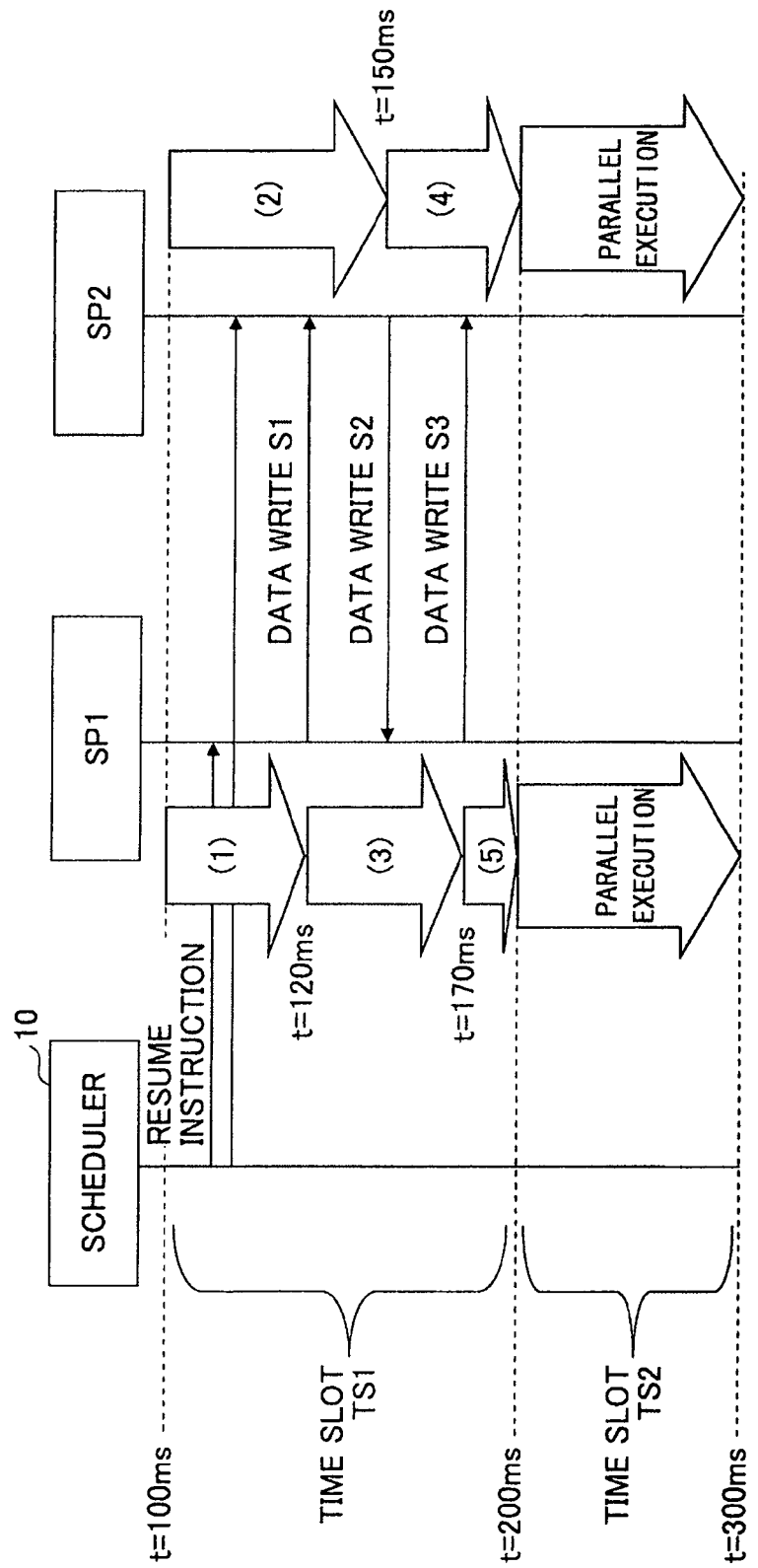
FIG. 12 is a third timing chart illustrating timings at which data exchanges are performed between SPs according to the one embodiment.

FIGS. 10 through 12 are timing charts illustrating timings at which data exchanges are performed between SPs according to an embodiment. FIGS. 10 through 12 illustrate an example in which two simulation programs, i.e., SP1 and SP2, are used. In FIG. 10, the scheduler 10 transmits simulation resume instructions to SP1 and SP2, respectively. In FIG. 10, SP1 and SP2 are executed in parallel during a time slot TS1. Through the parallel execution, it is ascertained that data write operations S1 through S3 are performed between SP1 and SP2 during the time slot TS1. The scheduler 10 thus determines to perform another simulation based on sequential execution for the time slot TS1.

In FIG. 11, SP1 and SP2 perform simulations again in a sequential manner for the time slot TS1 after restoring the simulation conditions stored at t=100 msec. A sequential execution may be performed according to the following algorithm, for example.

The scheduler 10 creates a sequence list indicating the order of sequential executions such as "SP1→SP2→SP1→SP2 . . . ", and instructs SP1 and SP2 according to this sequence list to perform simulations in a sequential manner. When a data exchange with another SP occurs in either SP1 or SP2 that is performing simulation, the scheduler 10 instructs the next SP in the sequence list to perform simulation in a sequential manner. When the simulation time of SP1 or SP2 that is performing simulation has reached the end of the time slot TS1, the scheduler 10 removes, from the sequence list, SP1 or SP2 that has reached the end of the time slot TS1.

In the example of FIG. 11, SP1 is the first to perform simulation in a sequential manner according to the sequence list. At t=120 msec, SP1 suspends the simulation because a data write operation S1 with respect to SP2 occurs at t=120 msec. In FIG. 11, then, SP2 performs simulation in a sequential manner according to the sequence list. At t=150 msec, SP2 suspends the simulation because a data write operation S2 with respect to SP1 occurs at t=150 msec.

In FIG. 11, then, SP1 performs simulation in a sequential manner according to the sequence list from the point of t=120 msec at which the simulation was suspended. At t=170 msec, SP1 suspends the simulation because a data write operation S3 with respect to SP2 occurs at t=170 msec.

In FIG. 11, then, SP2 performs simulation in a sequential manner according to the sequence list from the point of t=150 msec at which the simulation was suspended. Thereafter, no data exchange with SP1 occurs in SP2 until the end of simulation for the time slot TS1, so that the simulation comes to a halt at the end of the time slot TS1. The scheduler 10 removes SP2 from the sequence list.

In FIG. 11, then, SP1 performs simulation in a sequential manner according to the sequence list from the point of t=170 msec at which the simulation was suspended. Thereafter, no data exchange with SP2 occurs in SP1 until the end of simulation for the time slot TS1, so that the simulation comes to a halt at the end of the time slot TS1. The scheduler 10 removes SP1 from the sequence list.

In FIG. 12, SP1 and SP2 are executed in parallel during a time slot TS2. Through the parallel execution, it is ascertained that no data exchange occurs between SP1 and SP2 during the time slot TS2. The scheduler 10 thus determines not to perform another simulation based on sequential execution for the time slot TS2.

According to the present embodiment as described above, sequential execution is performed for a time slot during which communication is performed between SP1 and SP2. This ensures that the simulation results of SP1 and SP2 are uniquely determined in a reproducible manner. Further, parallel execution is performed for a time slot during which no communication is performed between SP1 and SP2. This improves processing speed by utilizing a distributed simulation environment.

It may be noted that the present embodiment may be modified such that at the time of first performing parallel execution, sequential execution is also performed together with the parallel execution. In this modified version in which sequential execution is performed together with parallel execution, the sequential execution may be brought to a halt halfway through upon the completion of the parallel execution without any data exchange between SP1 and SP2. The simulation results of the parallel execution are then used. Further, in this modified version in which sequential execution is performed together with parallel execution, the simulation results of the parallel execution are discarded upon the completion of the parallel execution when data exchange between SP1 and SP2 is detected. The simulation results of the sequential execution are then used after waiting for the completion of the sequential execution.

According to the present embodiment, reproducible simulation results are obtained in a distributed simulation environment.

Second Embodiment

In an environment in which actual devices operate, various disturbance factors such as variation in the device components and noise in the power supply circuit may be in existence. A distributed simulation environment may preferably ensure that tested devices properly operate despite the presence of various disturbance factors.

Figure 13:
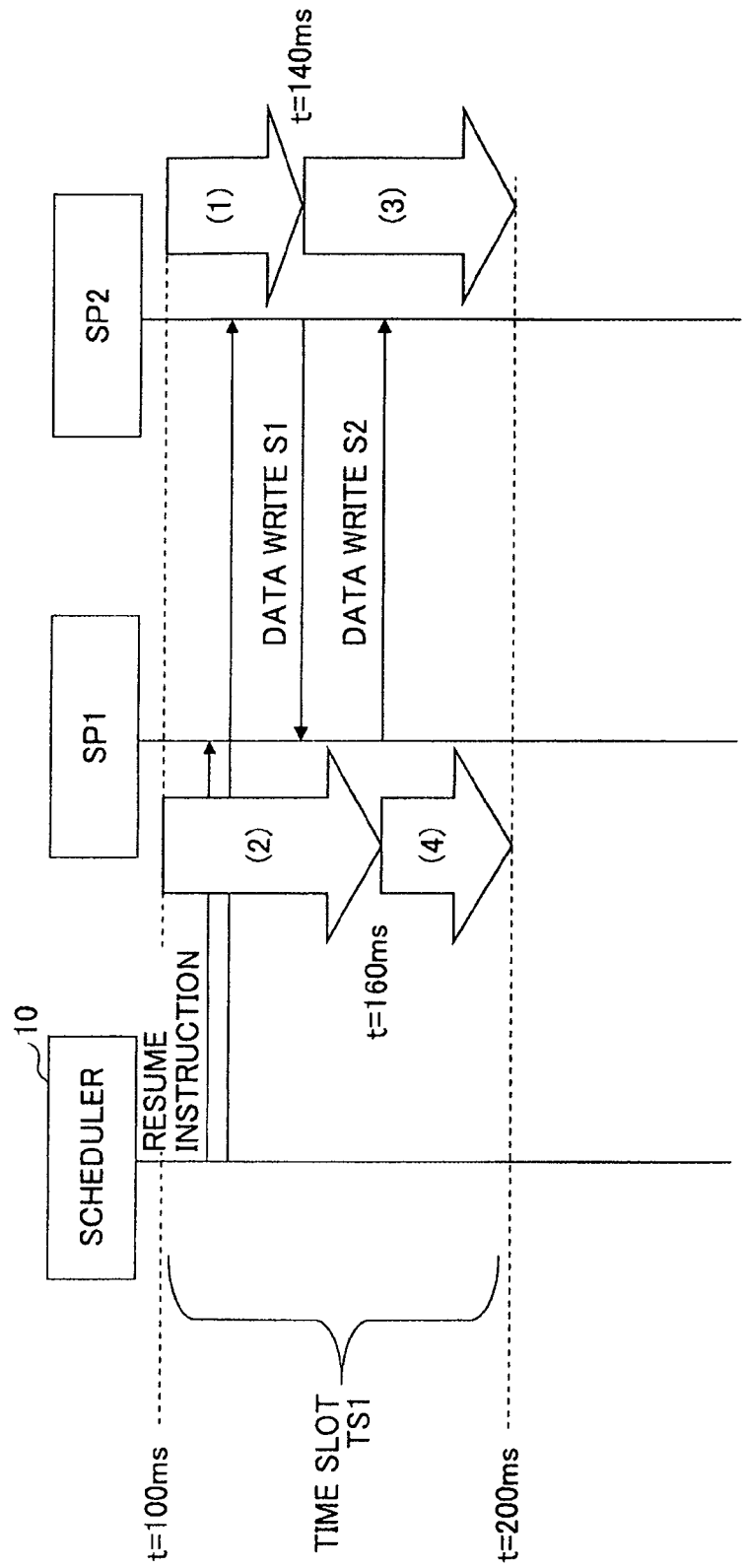
FIG. 13 is a timing chart illustrating timings at which data exchanges are performed between SPs according to one embodiment.

FIG. 13 is a timing chart illustrating timings at which data exchanges are performed between SPs according to one embodiment. FIG. 13 illustrates an example in which two simulation programs, i.e., SP1 and SP2, are used. In FIG. 13, the order of sequential executions is modified to create different simulation operations while maintaining the reproducibility of simulation results. Specifically, the order of sequential executions of SP1 and SP2 in FIG. 13 differs from the order used in the example of FIG. 11.

The scheduler 10 creates a sequence list indicating the order of sequential executions such as "SP2→SP1→SP2→SP1 . . . ", and instructs SP1 and SP2 according to this sequence list to perform simulations in a sequential manner. When a data exchange with another SP occurs in either SP1 or SP2 that is performing simulation, the scheduler 10 instructs the next SP in the sequence list to perform simulation in a sequential manner. When the simulation time of SP1 or SP2 that is performing simulation has reached the end of the time slot TS1, the scheduler 10 removes, from the sequence list, SP1 or SP2 that has reached the end of the time slot TS1.

The order of sequential executions may be determined by use of a random number generated based on a simulation time serving as a seed. When simulation time is used, the random number sequence is always constant.

The example of FIG. 13 differs from the example of FIG. 11 in that SP2 is the first to start in sequential executions. As a result, a data write operation S1 by SP2 occurs first in the example of FIG. 13, so that only one data write operation S2 is performed by SP1.

Figure 14:
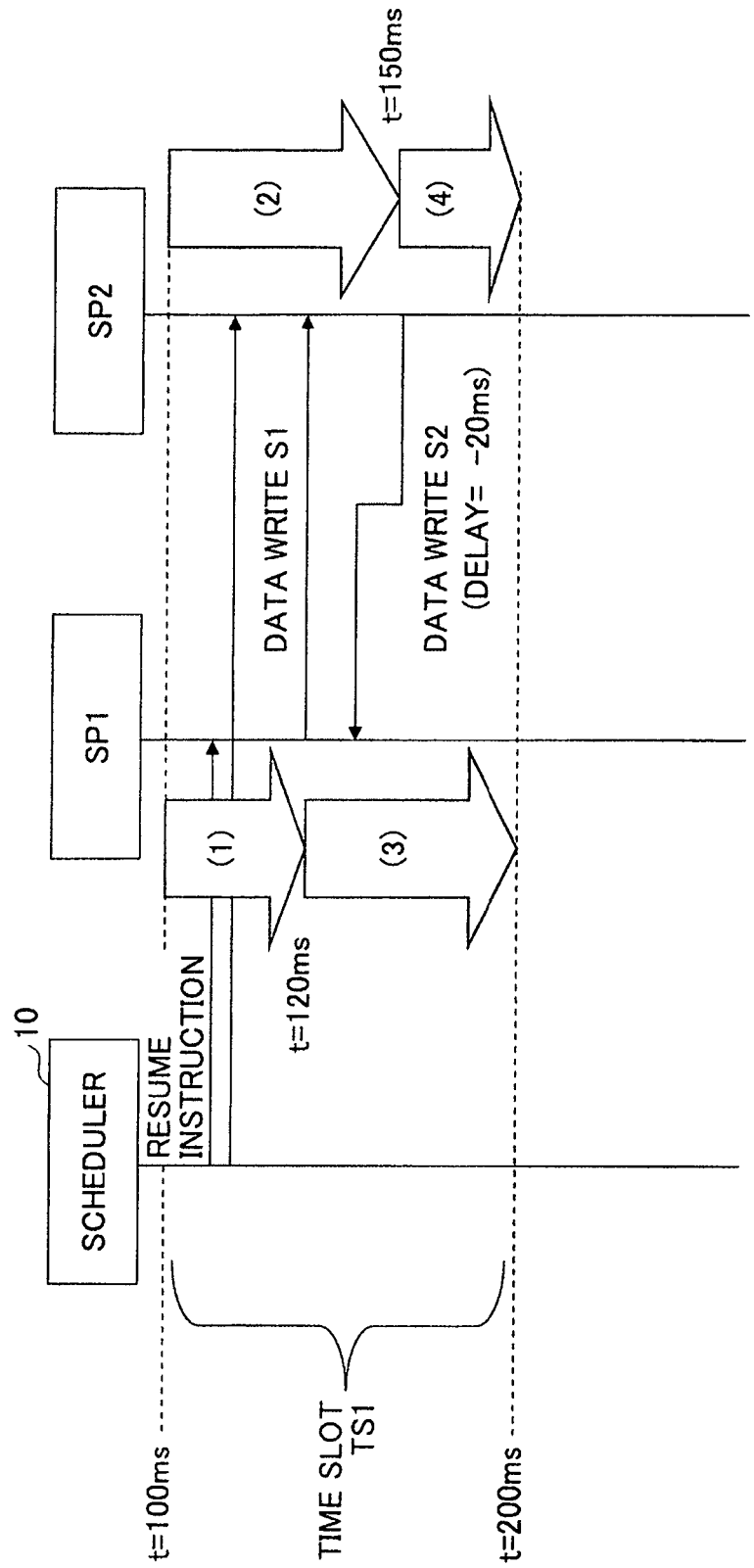
FIG. 14 is a timing chart illustrating timings at which data exchanges are performed between SPs according to another embodiment.

FIG. 14 is a timing chart illustrating timings at which data exchanges are performed between SPs according to another embodiment. FIG. 14 illustrates an example in which two simulation programs, i.e., SP1 and SP2, are used. In FIG. 14, disturbance factors can be simulated by changing a delay time imposed on a data exchange between SP1 and SP2.

In FIG. 14, a delay time of −20 msec is imposed on the data write operation S2 performed by SP2 as in the case of FIG. 12.

Consequently, SP1 receives the data write operation S2 at t=150+(−20)=130 msec while the data write operation S2 is issued at t=150 msec by SP2.

Variation of a delay time imposed on a data exchange between SP1 and SP2 may be implemented by changing, by an amount equal to the delay time, an indication of the simulation time at which a request packet is issued upon storing such an indication in the time sequence queue illustrated in FIG. 9, for example. The delay time can be freely set based on the concept of a loosely-timed model unless the simulation time is reversed at the receiver side that receives a data exchange.

In the example illustrated in FIG. 14, the arrival time of the data write operation S2 from SP2 to SP1 can be freely set within a range defined as: 120 msec<t≦200 msec. FIG. 14 illustrates an example of a delay time being set to a negative value.

In an environment in which actual devices operate, various disturbance factors such as variation in the device components and noise in the power supply circuit may be in existence. The present embodiment can simulate variation in processing speed of circuit modules and variation in data transfer between circuit modules caused by various disturbance factors. In other words, the present embodiment provides the function to simulate disturbance factors that may exist at the time of real device operations. Objects (e.g., LSI circuits) tested by use of a distributed simulation environment of the present embodiment thus have improved robustness against disturbance factors.

According to at least one embodiment, a high-speed and reproducible distributed simulation environment can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium having a scheduler program embodied therein for controlling parallel execution of plural simulation programs, the scheduler program causing a computer to perform a simulation procedure, the simulation procedure comprising:
a parallel execution procedure by which the plural simulation programs are performed in parallel during a first period in which there is no data exchange between the plural simulation programs;
a sequential execution procedure by which the plural simulation programs are sequentially performed during a second period in which there is data exchange between the plural simulation programs; and
wherein a length of the first period and a length of the second period are equal to a constant interval, and the parallel execution procedure and the sequential execution procedure are performed separately in a repetitive manner in units of the constant interval.

2. The computer-readable, non-transitory medium as claimed in claim 1, the simulation procedure further comprising:
causing a storing procedure to be performed to store simulation conditions at a commencement of the parallel execution procedure,
wherein the sequential execution procedure is performed after both a stoppage of the parallel execution procedure and a restoration of the stored simulation conditions upon detecting the data exchange during the parallel execution procedure, and the sequential execution procedure causes the plural simulation programs to be sequentially performed, by starting from a time at which the storing procedure is performed, for a duration of the second period in which there is the detected data exchange.

3. The computer-readable, non-transitory medium as claimed in claim 1, wherein
the sequential execution procedure is performed together with the parallel execution procedure;
a simulation result of the parallel execution procedure is adopted for a period in which there is no data exchange between the plural simulation programs; and
a simulation result of the sequential execution procedure is adopted for a period in which there is data exchange between the plural simulation programs.

4. A scheduler apparatus for controlling parallel execution of plural simulation programs, the scheduler apparatus comprising:
a processor configured to execute a procedure, the procedure comprising:
causing the plural simulation programs to be performed in parallel during a first period in which there is no data exchange between the plural simulation programs;
causing the plural simulation programs to be sequentially performed during a second period in which there is data exchange between the plural simulation programs; and
wherein a length of the first period and a length of the second period are equal to a constant interval, and the parallel execution procedure and the sequential execution procedure are performed separately in a repetitive manner in units of the constant interval.

* * * * *